No. 766,050.

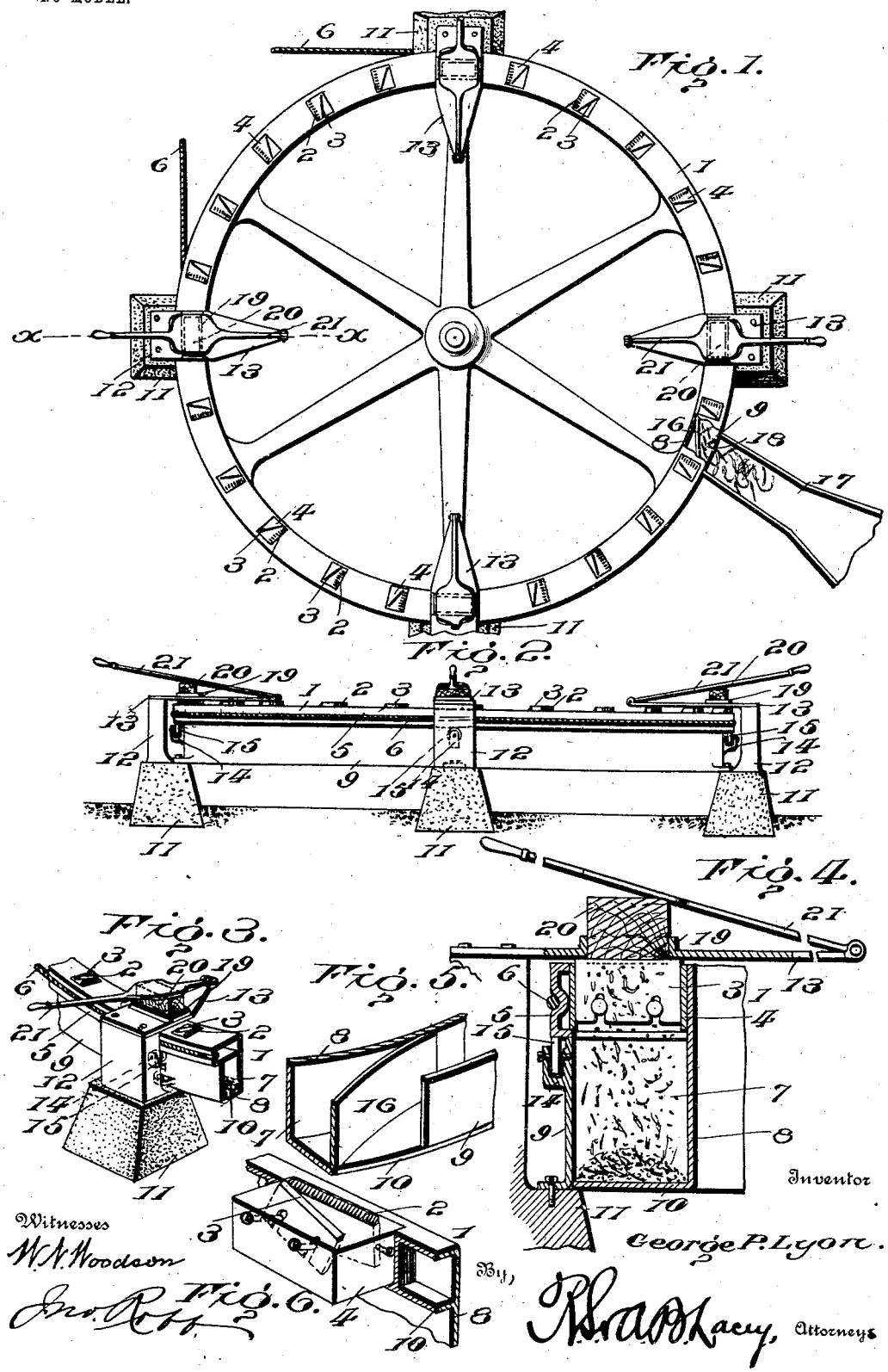

Patented July 26, 1904.

UNITED STATES PATENT OFFICE.

GEORGE P. LYON, OF WOODFORD, VIRGINIA.

EXCELSIOR-MACHINE.

SPECIFICATION forming part of Letters Patent No. 766,050, dated July 26, 1904.

Application filed February 6, 1904. Serial No. 192,362. (No model.)

*To all whom it may concern:*

Be it known that I, GEORGE P. LYON, a citizen of the United States, residing at Woodford, in the county of Caroline and State of Virginia, have invented certain new and useful Improvements in Excelsior-Machines, of which the following is a specification.

This invention relates to machines for shredding wood in the manufacture of excelsior, the purpose being to devise a machine of novel structure which will be light running, capable of a greater output when compared with like machines of given size operating a like interval of time and utilizing a corresponding number of units of force, and which will be durable, efficient, and discharge the excelsior at one point.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a top plan view of a machine embodying the invention. Fig. 2 is a side view thereof. Fig. 3 is a detail perspective view of a portion of the rim of the cutter-wheel, a support for the bolt or block, the pressure-lever, and adjunctive parts. Fig. 4 is a cross-section on the line X X of Fig. 1, showing the parts on a larger scale. Fig. 5 is a detail perspective view of the carrier and clearer. Fig. 6 is a detail perspective view of a portion of the cutter-wheel, showing the block and the cutter supported thereby.

Corresponding and like parts are referred to in the following description and indicated in all the views of the drawings by the same reference characters.

The cutter-wheel is indicated at 1 and is arranged in the usual manner to revolve in a horizontal plane about a vertical axis and is provided with a series of scoring and cutting blades, which may be of any structural type common in machines of this class.

The scoring-knives are indicated at 2, and the cutting knives or blades at 3, both sets of knives being applied to blocks 4, which are fitted in openings arranged at intervals in the circumferential portion of the wheel. The power for driving the cutter-wheel is applied preferably to the outer portion, thereby obviating the strain upon the shaft and spokes or arms common in excelsior-machines as generally constructed and operated. Within the purview of the invention the power may be applied to the wheel in any determinate way, and, as indicated, the rim 5 is provided with a groove in which a cable 6 is fitted and is connected with any suitable source of power for transmitting motion to the cutter-wheel. The rim of the wheel is hollow, as shown at 7, and comprises inclosing walls 8, 9, and 10. The walls 8 and 10 are right-angularly disposed and are connected with the wheel so as to rotate therewith, whereas the wall 9 is stationary and is supported in any substantial way, as by means of the pillow-blocks 11, upon which are mounted the standards 12, to which the plates 13, receiving the bolts or wooden blocks, are attached. The walls 8 and 9 are transversely spaced, and the wall 10 constitutes a bottom and closes the lower end of the space 7, constituting the hollow rim or conveyer into which the shreds of wood or excelsior are discharged. A bracket 14 extends from the wall 9 opposite to each of the standards 12 and in conjunction with said wall supports a roller 15, upon which the wheel is mounted for rotation. The rollers or wheels 15 are preferably located in the plane of the rim 5, whereby the best results are attained as regards stability of structure and efficiency.

The wall or support 10 constitutes, in effect, a carrier, since the excelsior drops thereon and is supported thereby and carried to the determinate point of discharge. The vertical walls 8 and 9 prevent lateral displacement of the excelsior, and the wall 8 further serves as a connecting means between the part 10 and the wheel. By having the outer wall 9 stationary it is admirably adapted for supporting the wheels 15, which carry and sustain the weight of the cutter-wheel, and also provides means for carrying the clearer 16, by means of which the excelsior is removed from the carrier and directed into a chute 17 or other receptacle arranged for reception of the material. The clearer 16 may be a part of the wall 9 or may be attached thereto. The clearer 16 consists of a plate extended across the space 7 and sweeping over the horizontal wall 10 and inclined to the plane of motion of the cutter-wheel, so as to direct the excelsior outward through the opening 18, formed in the outer wall 9 and constituting the discharge.

Each of the horizontal plates 13 is provided with an opening directly above the rim of the cutter-wheel, said opening being reinforced by a vertical rim 19, which forms, in effect, a hopper or guide to receive the bolt or block 20, which is shredded in the operation of the machine to provide the excelsior. A lever 21 is pivoted to each of the plates 13 and normally exerts a pressure on the bolt or block 20 to advance the same to the cutting mechanism as the excelsior is formed.

By applying the power to the outer portion of the cutter-wheel the hub and spokes of the wheel may be compartively light, since they are not subjected to the strain which would be required if utilized for transference of the power to the rim carrying the cutting mechanism. Moreover, a minimum amount of energy is required to be expended for operating the machine, and a greater number of bolts or blocks 20 may be placed in position for formation of the excelsior. By having the material collected from all of the bolts or blocks and discharged at a common point the space beneath and around the machine is kept clear, the material prevented from contact with the grease or moving parts of the machine, and the annoyance and expense of collecting and gathering the material wholly obviated.

The horizontal plate 10 acts in the capacity of a supporting-surface upon which the material is received and carried in a loose state until swept laterally therefrom by the clearer 16. Inasmuch as the cutters are arranged closely about the peripheral portion of the cutter-wheel 1, the material is practically distributed uniformly and loosely upon the supporting surface or wall 10 and is moved laterally therefrom at approximately the point of its reception, thereby preventing the pushing of the material ahead and the rolling and entanglement thereof, as is the case where the material drops from the cutter-wheel upon a stationary supporting-surface and is moved thereover by means of an expelling device traveling with the cutter-wheel, with the result that the material is bunched, crowded, and condensed. In accordance with this invention there is, in effect, a continuous discharge of the material in a loose state.

Having thus described the invention, what is claimed as new is—

1. In an excelsior-machine, the combination with the wheel horizontally arranged and provided with a series of scoring and cutting knives, a wall arranged below said wheel and connected for rotation therewith and adapted to receive and carry the excelsior, and a stationary clearer extended across said wall to sweep the excelsior laterally therefrom at approximately the point of its reception thereon, substantially as described.

2. In an excelsior-machine, the combination with the wheel horizontally arranged and provided with a series of scoring and cutting knives, a wall arranged below and connected with said wheel to receive and carry the excelsior, vertical walls for confining the excelsior laterally upon the horizontal wall, one of said vertical walls having a lateral discharge, and a clearer extended through said discharge across the horizontal wall to sweep the material therefrom through the discharge at approximately the point of its reception thereon, substantially as set forth.

3. In an excelsior-machine, the combination with the wheel provided with a series of scoring and cutting knives, a horizontal wall spaced from the wheel, vertically-disposed walls at opposite sides of the horizontal wall and acting jointly therewith to inclose a space, one of said walls being connected to the wheel and supporting the horizontal wall and the other wall being stationary, and a clearer projected from the stationary wall across the space inclosed by the aforesaid walls to effect discharge of the material, substantially as specified.

4. In an excelsior-machine, the combination of the cutter-wheel provided with a series of scoring and cutting knives, vertical walls transversely spaced, one of said walls being stationary and the other connected to the wheel for rotation therewith, a horizontal wall closing the bottom of the space formed between the vertical walls and rotatable with the cutter-wheel, the stationary wall having a discharge-opening, and a clearer extended from a side of the discharge-opening across the space formed between said walls in an oblique direction to insure discharge of the material through the opening, substantially as set forth.

5. In an excelsior-machine, the combination of the cutter-wheel provided with a series of scoring and cutting knives, means for applying the driving power to the outer portion of the cutter-wheel, a supporting-surface arranged beneath and connected with the cutter-wheel to receive the material, and means for effecting a lateral discharge of the material from the said supporting-surface at substantially the point of its reception thereon, substantially as set forth.

6. In an excelsior-machine, the combination of the cutter-wheel horizontally arranged and provided with a series of scoring and cutting knives, a horizontal wall arranged below said wheel to receive the excelsior, a vertical wall connecting the horizontal wall with the cutter-wheel, a stationary circular wall having a lateral discharge-opening, a rim pendent from the cutter-wheel and acting jointly with said circular stationary wall to close the space between the horizontal wall and cutter-wheel at one side, rotary supports between the said pendent rim and vertical stationary wall, and a clearer extended through the aforesaid lateral discharge-opening and over the horizontal wall, substantially as specified.

7. In an excelsior-machine, the combination of the cutter-wheel provided with a series of scoring and cutting knives, pillow-blocks located at intervals in the circumference of the cutter-wheel and supporting the means for retaining the wood blocks in place and feeding them to the machine, a stationary wall secured to the pillow-blocks and provided at intervals with rotary supports for the cutter-wheel, a second wall concentric with and spaced from the stationary wall and connected with the cutter-wheel for rotation therewith, a horizontal wall closing the bottom of the space formed between the concentric walls and connected to the rotary wall, and a clearer for removing the material from the space inclosed by the several walls, substantially as set forth.

In testimony whereof I affix my signature in presence of two witnesses.

GEORGE P. LYON. [L. S.]

Witnesses:
W. N. WOODSON,
JNO. ROBB.